(12) United States Patent  (10) Patent No.: US 7,870,669 B2
Ribeiro et al.  (45) Date of Patent: Jan. 18, 2011

(54) MULTI-AXIALLY FORGED PISTON

(75) Inventors: Carmo Ribeiro, Ann Arbor, MI (US); Richard R. Gofton, Chelsea, MI (US); Hongsheng Lin, Ann Arbor, MI (US); Randall R. Gaiser, Chelsea, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 10/899,959

(22) Filed: Jul. 27, 2004

(65) Prior Publication Data

US 2005/0034598 A1 Feb. 17, 2005

Related U.S. Application Data

(63) Continuation of application No. 09/981,414, filed on Oct. 17, 2001, now Pat. No. 6,840,155.

(60) Provisional application No. 60/241,759, filed on Oct. 18, 2000.

(51) Int. Cl.
*B21K 1/18* (2006.01)
*F16J 1/16* (2006.01)

(52) U.S. Cl. ................ 29/888.05; 92/187

(58) Field of Classification Search ........... 92/186, 92/231; 29/888.05
See application file for complete search history.

(56) References Cited

U.S. PATENT DOCUMENTS

| 1,772,215 A | * | 8/1930 | Grant | ............ 92/231 |
| 2,024,285 A | * | 12/1935 | Handler | ............ 92/239 |
| 2,077,688 A | | 4/1937 | Gottlieb | |
| 2,136,822 A | * | 11/1938 | Moore | ............ 92/187 |
| 2,261,931 A | | 11/1941 | Alexandrescu | |
| 2,442,408 A | | 6/1948 | Graham | |

(Continued)

FOREIGN PATENT DOCUMENTS

DE    3032671 A1    3/1982

(Continued)

OTHER PUBLICATIONS

Merriam-Webster Inc. Copyright 1993 Webster's Third New International Dictionary 3 pages.

(Continued)

*Primary Examiner*—F. Daniel Lopez
(74) *Attorney, Agent, or Firm*—Robert L. Stearns; Dickinson Wright, PLLC

(57) ABSTRACT

A multi-axially forged mono-bloc piston includes a lower crown part forged of steel and including a pair of pin bosses and an integral skirt formed as one piece with the pin bosses 20. The lower crown part is friction welded to an upper crown part to form at least one closed oil gallery within the piston head. The lower crown part is forged in the longitudinal direction of the piston as well as laterally to impart longitudinal and laterally forged features of the piston. The laterally forged features may comprise undercut recesses formed in the piston skirt to reduce material in the overall piston structure. The lateral forging may also result in the piston skirt portion being discoupled from the piston head by laterally forged slots formed in the lower crown part 14 between the skirt and head.

2 Claims, 7 Drawing Sheets

U.S. PATENT DOCUMENTS

| | | | | |
|---|---|---|---|---|
| 2,465,792 A | * | 3/1949 | Davis | 92/208 |
| 2,771,327 A | | 11/1956 | Reinberger | |
| 3,104,922 A | | 9/1963 | Baster | |
| 3,324,772 A | * | 6/1967 | Wittstock | 92/222 |
| 3,341,924 A | | 9/1967 | Clary et al. | |
| 3,613,521 A | | 10/1971 | Itano | |
| 3,654,840 A | | 4/1972 | Elliott | |
| 4,011,797 A | | 3/1977 | Cornet | |
| 4,286,505 A | | 9/1981 | Amdall | |
| 4,364,159 A | | 12/1982 | Holcombe | |
| 4,532,686 A | | 8/1985 | Berchem | |
| 4,581,983 A | | 4/1986 | Moebus | |
| 4,635,596 A | | 1/1987 | Nakano et al. | |
| 4,651,631 A | | 3/1987 | Avezou | |
| 4,662,047 A | | 5/1987 | Berchem | |
| 4,727,795 A | | 3/1988 | Murry et al. | |
| 4,747,340 A | | 5/1988 | Schellmann et al. | |
| 4,838,149 A | | 6/1989 | Donnison et al. | |
| 4,843,698 A | | 7/1989 | Ripberger et al. | |
| 4,910,093 A | | 3/1990 | Berchem et al. | |
| 4,941,397 A | * | 7/1990 | Kawai et al. | 92/222 |
| 5,040,454 A | | 8/1991 | Ballheimer et al. | |
| 5,136,992 A | | 8/1992 | Bregler et al. | |
| 5,144,885 A | | 9/1992 | Suzuki et al. | |
| 5,150,517 A | | 9/1992 | Martins Leites et al. | |
| 5,562,074 A | | 10/1996 | Koch | |
| 5,934,174 A | | 8/1999 | Abraham, Sr. et al. | |
| 5,972,071 A | | 10/1999 | Koike et al. | |
| 5,992,015 A | | 11/1999 | Kurita et al. | |
| 6,026,777 A | | 2/2000 | Kemnitz et al. | |
| 6,032,570 A | | 3/2000 | Koike et al. | |
| 6,070,323 A | | 6/2000 | Koike et al. | |
| 6,155,157 A | | 12/2000 | Jarrett | |

FOREIGN PATENT DOCUMENTS

| | | |
|---|---|---|
| JP | 55153838 | 12/1980 |
| JP | 62-132415 | 8/1987 |
| JP | 63-130238 | 6/1988 |
| JP | 06-002613 | 1/1994 |
| JP | 60-166157 | 8/1995 |
| JP | 2000-097106 | 4/2000 |
| JP | 2000-158083 | 6/2000 |

OTHER PUBLICATIONS

Alfred H. White, McGraw-Hill Book Company, inc. 1948 Engineering Materials 5 pages.

Machine Precision Institute 1941 Modern Shop Practice 19 pages.

Edward Arnold Publishers Limited, Copyright 1975 An Introduction to Metallurgy, Second Edition 30 pages.

American Society for Metals, Copyright 1985 Metal Handbook Desk Edition 9 pages.

Erich Wacher and Wilbried Sander, Piston Design for High Combustion Pressures and Reduced Heat Rejection to Coolant, Karl Schmidt GmbH, 820505.

* cited by examiner

MULTI-AXIALLY FORGED PISTON

This application is a continuation of U.S. Ser. No. 09/981,414, filed Oct. 17, 2001 now U.S. Pat. No. 6,840,155 which claims priority to U.S. Provisional Patent Application Ser. No. 60/241,759, filed Oct. 18, 2000.

BACKGROUND OF THE INVENTION

1. Technical Field

This invention relates generally to pistons for heavy duty diesel engines, and to the method of making such pistons.

2. Related Art

Pistons for heavy duty diesel engine applications are typically either of a monobloc construction in which the piston head, pin bosses and skirt are cast of a single piece, or of an articulated construction in which the piston skirt is formed separately from the rest of the piston and joined thereto an articulated fashion through the wrist pin.

U.S. Pat. No. 4,581,983 discloses a piston of monobloc construction wherein the upper part is forged and the lower part is cast and joined at an inner face by welding with charged carrier rays with an inter layer of nickel.

U.S. Pat. No. 3,654,840 discloses a one-piece forged piston formed in a uni-axial forging process.

U.S. Pat. No. 4,910,093 discloses a method of forging a one-piece piston blank of an articulated piston. This reference has no teachings with respect to forging monobloc pistons wherein the piston skirt is an integral part of the piston structure, rather than being a separately formed, articulated component.

SUMMARY OF THE INVENTION

According to the invention, a method is provided for forging at least the lower crown portion of a monobloc piston. The forged article includes at least a portion of the piston head, a pair of pin bosses extending downwardly from the piston head, and a piston skirt formed as one piece with the pin bosses including a pair of opposed skirt portions spaced from the pin bosses and intervening strut portions extending between and joining the skirt portions to the pin bosses as a one piece structure.

According to the method of the invention, the above features are formed by die-forging a blank of steel in a first axial direction. The piston article is further forged in a second axial direction which is transverse to the first axial direction to produce a forged recess in each of the strut portions of the piston skirt. The invention has the advantage of providing a method of forging at least a lower crown part of a monobloc piston using a multi-axial forging process which minimizes the bulk of material, and thus weight of the piston as compared to uni-axially forged pistons. The material displaced in the transverse forging step forms other parts of the piston structure in the die, thus decreasing the amount of material needed to manufacture forged monobloc pistons.

The invention further is directed to forged monobloc pistons made by such a multi-axial forging process, wherein at least the lower part of the piston has the skirt and pin bosses formed as one piece and forged in the longitudinal direction as well as in a lateral direction to provide recesses in the strut portions that connect the skirt portions to the pin bosses. A piston constructed in such manner shares the same advantages as described above with respect to the multi-axial forging method.

THE DRAWINGS

Presently preferred embodiments of the invention are disclosed in the following description and in the accompanying drawings, wherein.

DETAILED DESCRIPTION

Figure 1:
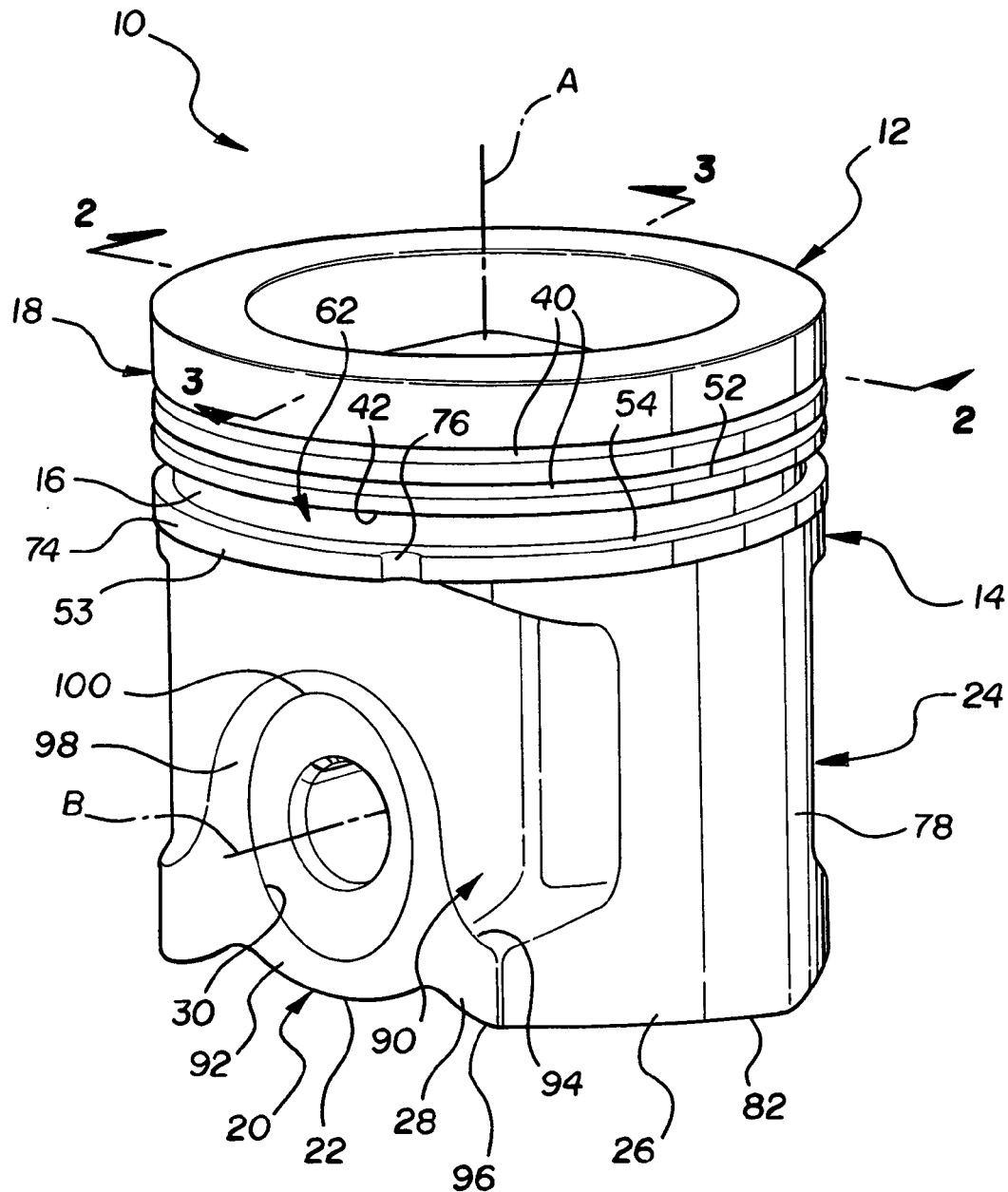
FIG. 1 is a perspective elevation view of a piston constructed according to a first embodiment of the present invention.
Figure 2:
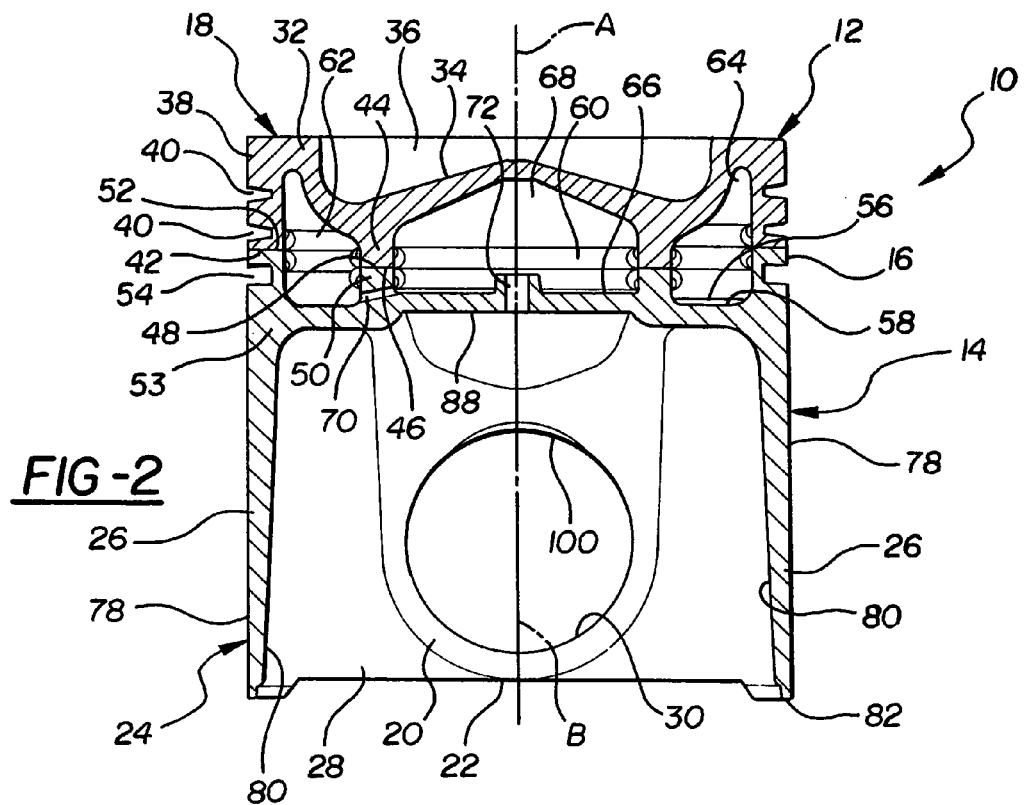
FIG. 2 is a cross-sectional view taken along lines 2-2 of FIG. 1.
Figure 3:
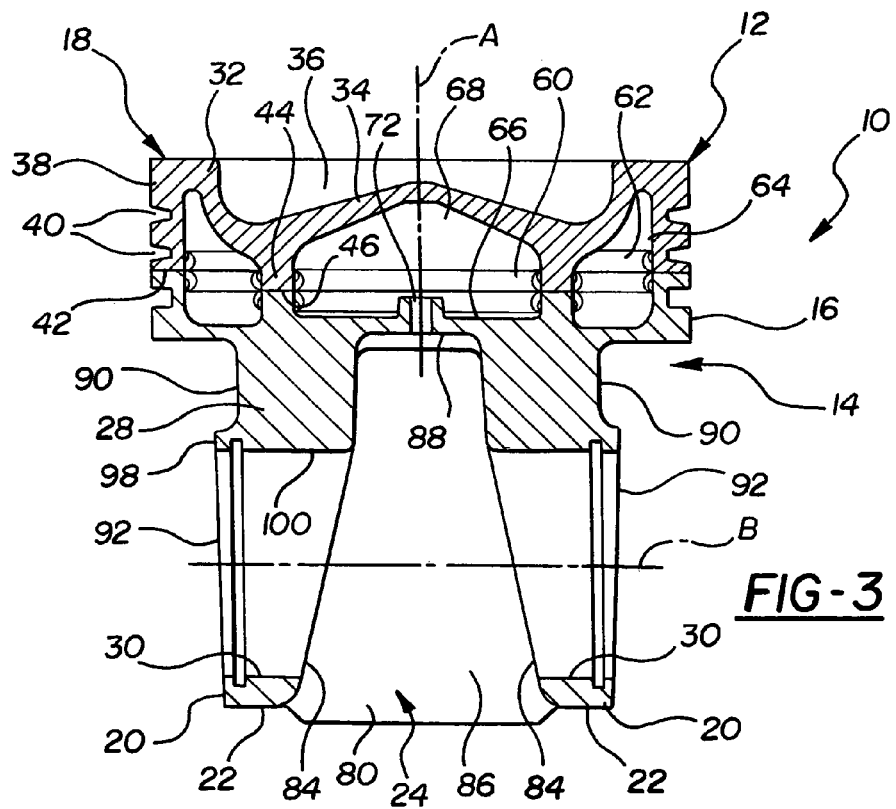
FIG. 3 is a cross-sectional view taken along lines 3-3 of FIG. 1.
Figure 4:
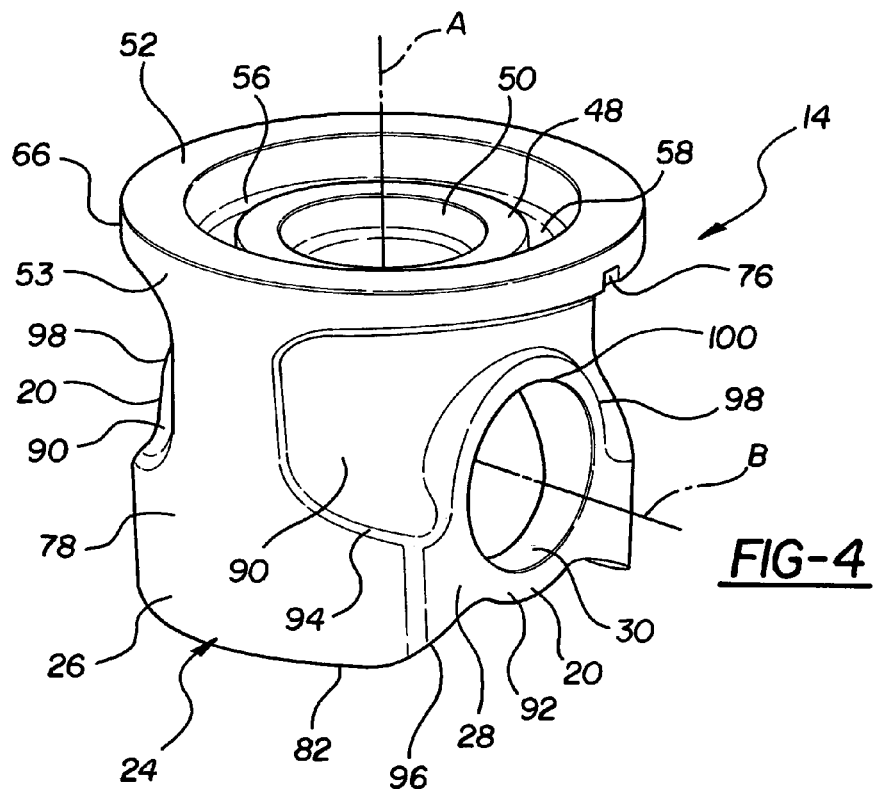
FIG. 4 is a perspective view of a lower forged portion of the piston.
Figure 5:
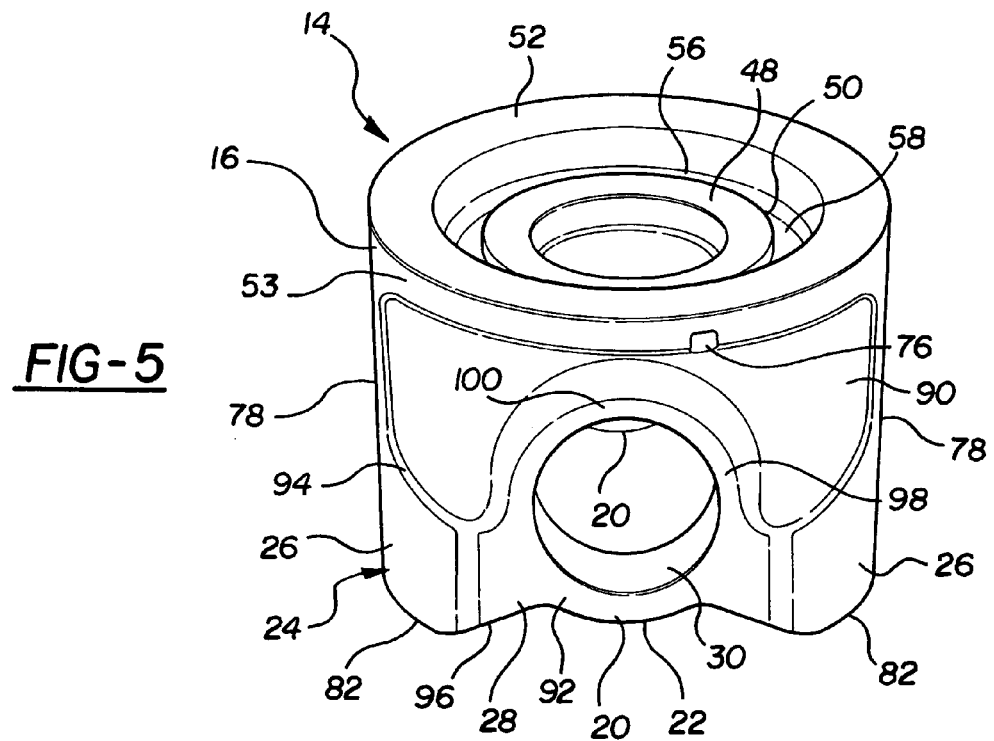
FIG. 5 is another perspective view of the lower forged portion.
Figure 6:
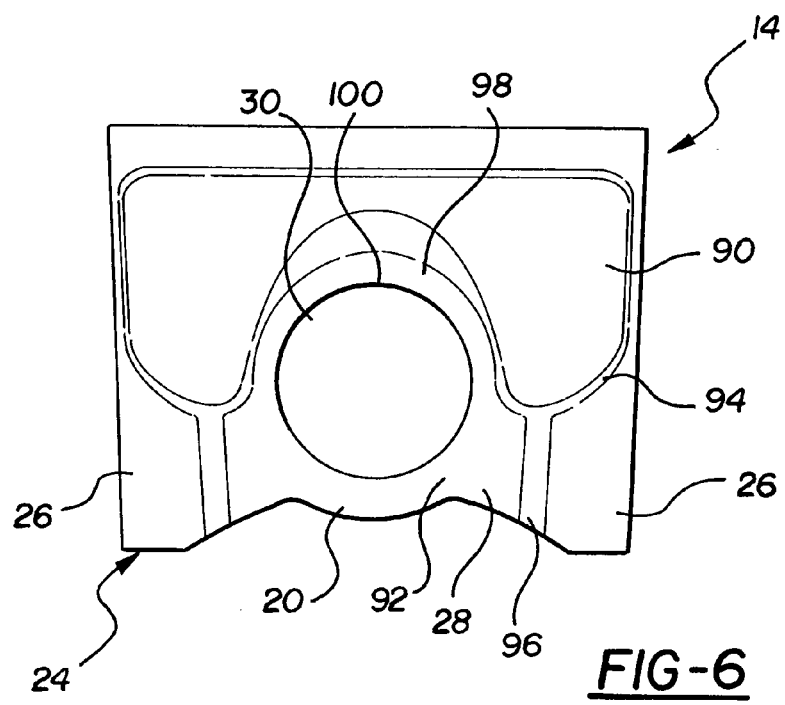
FIG. 6 is a front elevation view of the lower forged portion.
Figure 7:
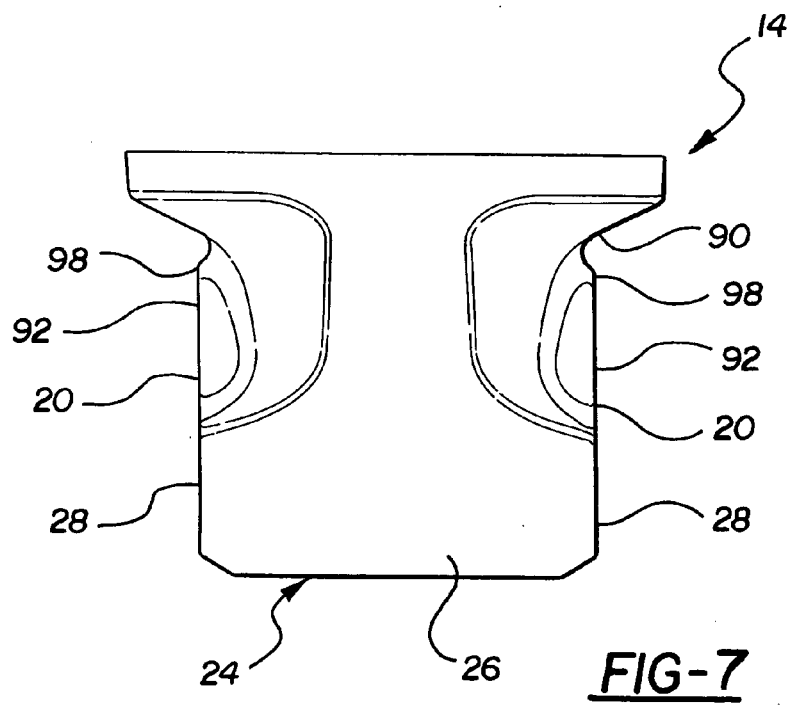
FIG. 7 is a side elevation view of the lower piston portion of FIG. 6.

A monosteel piston constructed according to a first embodiment of the invention is indicated generally at 10 in FIGS. 1-7 and comprises an upper crown part 12 fabricated of steel and a lower crown part 14. The lower crown part 14 is forged of one piece of steel and includes at least a portion 16 of a head 18 of the piston 10, a pair of pin bosses 20 extending downwardly from the head portion 16 to lower free ends 22 thereof, and a piston skirt 24 formed as one piece with the pin bosses of the same forged material. The skirt includes a pair of skirt portions 26 which are arranged on laterally opposite sides of the piston in spaced relation to the pin bosses 20, and intervening strut portions 20 extending between and interconnecting the skirt portions 26 and pin bosses 20.

The piston 10 includes a longitudinal axis A and a pin bore axis B transverse and preferably perpendicular to the longitudinal axis A. The pin bosses 20 are formed with pin bores 30 aligned along the pin bore axis B.

The lower crown part 14 is forged separately from the upper crow part 12. While the upper crown part 12 is preferably forged, but could be formed by other techniques such as casting. The upper crown part 12 has a circumferentially continuous upper wall 32 surrounding a dome-shaped bowl wall 34 defining a recessed combustion bowl 36 at the top of the piston 10. An outer wall or ring belt 38 extends downwardly from the upper wall 32 in radially outwardly spaced relation to the combustion bowl wall 34. The ring belt 38 is formed with at least one and preferably a pair of combustion ring grooves 40. The ring belt 38 extends to a lower circumferentially continuous joining surface 42.

A circumferentially continuous inner wall 44 of the upper crown part 12 extends downwardly from the combustion bowl wall 34 in radially innerwardly spaced relation to the outer wall 38. The inner wall 44 presents a circumferentially continuous joining surface 46 at its lower end. The joining surfaces 42,46 are preferably non-coplanar such that the inner wall joining surface 46 resides in a plane lower than the joining surface 42 of the outer wall 38 as illustrated in FIGS.

2 and 3. The inner wall 44 is preferably parallel to the outer wall 38 in the longitudinal direction and concentric with respect to the longitudinal axis A of the piston 10. The combustion bowl wall 34 extends upwardly from the inner wall 44 to a peak at the longitudinal axis A to provide an arched combustion bowl structure with peaked combustion bowl walls 34 supported by the longitudinally extending circumferentially continuous inner wall 44 extending parallel to the longitudinal axis A.

The lower crown part 14, as mentioned, is formed as a separate forged component from the upper crown part 12. The lower crown part 14 includes at least an inner circumferentially continuous joining surface 48 provided at the upper end of a circumferentially continuous inner wall 50 extending upwardly from and joined to the pin bosses 20 in coaxial alignment with the joining surface 46 of the inner wall 44 of the upper crown part 12.

The piston skirt 24 of the lower crown part 14 in the first embodiment presents a circumferentially continuous upper joining surface 52 that is spaced radially outwardly of the joining surface 48 of the inner wall 50 and coaxially in line with the joining surface 42 of the ring belt 38. The joining surfaces 48,52 are preferably longitudinally offset in different planes to compliment the offset upper crown part joining surfaces 46,42, respectively. As such, the joining surface 52 of the skirt 24 is disposed in a plane axially above the plane of the inner wall joining surface 48, and the corresponding inner joining surfaces 46,48 and outer joining surfaces 42,52 of the upper and lower crown parts 12,14, respectively, come together in mutually engaging relationship.

The piston skirt 24 of the lower crown part 14 of the first embodiment is preferably formed with at least one ring groove 54 for receiving an oil ring of the piston 10. A circumferentially continuous channel 56 is forged in the lower crown part 14 and extends into the skirt 24 in the space between the inner wall 50 and an outer skirt wall 53 of the skirt 24. A floor 58 of the channel 56 is spaced below the joining surfaces 48,52 and preferably below the ring groove 54 formed in the skirt wall 53.

According to the invention, the upper and lower crown parts 12,14 are friction welded together, such that the parts 12,14 are joined by permanent friction weld joints 60,62 across their mating inner 46,48 and outer 42,52 joining surfaces, respectively. When joined, the upper and lower crown parts 12,14 define at least one circumferentially continuous closed oil gallery 64 radially between the adjoined inner walls 44,50 and outer walls 38,53 of the upper and lower crown parts 12,14, respectively.

According to the first embodiment, the lower crown part 14 is further formed with an inner gallery floor 66 spanning the space between the inner wall surfaces 50 and enclosing, when the upper and lower crown parts 12,14 are joined together, an inner oil gallery 68. The inner gallery floor 66 is likewise forged in the lower crown part 14 during formation of the one piece lower crown part. The outer oil gallery 64 communicates with the inner oil gallery 68 through one or more ports 70, and the inner oil gallery 68 communicates with the space between the pin bosses 20 through an opening 72 formed in the gallery floors 66. One or more drain holes 76 are forged in the lower part 14. The drain holes 76 are recessed in the outer surface of the skirt wall 53 and open longitudinally into the ring groove 54 from below to provide oil drainage to the groove 54 during operation of the piston 10.

The lower crown part 14 is preferably fabricated by a multi-axial forging operation, wherein a lower crown part blank is forged both in the longitudinal axis A of the lower crown part 12 and also in a direction transverse to the axis A to impart transversely forged features in the lower crown part 14 that cannot be attained by forging in the longitudinal direction of axis A. In the illustrated embodiment of FIGS. 1-7, the lower crown part 14 is forged in the longitudinal axis A to form the upper head portion 16, including the inner wall 50, outer skirt wall 53 and the channel 56 therebetween, as well as the floor 66 of the inner oil gallery 68 with forging die tools from above. From below, the piston skirt 24 and pin bosses 20 are forged in the longitudinal direction of the axis A of the piston 10. The skirt portions 26 have an outer working surface 78 which is in line with and formed as an extension of the outer surface of the ring belt 38 when the upper and lower crown parts 12,14 are joined. The outer working surface 78 is adapted to confront the walls of a piston cylinder (not shown) during the reciprocating movement of the piston to assist in keeping the piston aligned properly in the piston bore during operation of the engine (not shown). The outer working surface 78 is preferably parallel to the longitudinal axis A. The skirt portions 26 have a radially inwardly facing inner surface 80 which is preferably disposed in an angle relative to the outer working surface 78 such that the skirt portions 26 are relatively thinner near their lower free ends 82 thereof and relatively thicker in the vicinity of the upper skirt wall 53, and preferably tapers so as to be continually thickening in the direction of the lower to upper end of the piston skirt 24. The length of the skirt portions 26 is preferably about the same as and still more preferably slightly longer than the length of the pin bosses 20, such that the lower end 82 of the skirt portions 26 reside at or slightly below the lower ends 22 of the pin bosses 20.

Inner surfaces 84 of the pin bosses 20 and the lateral space 86 therebetween is likewise formed in the axial forging of the lower crown part 12 from below along the longitudinal axis A. The inner surfaces 84 are preferably disposed at an angle relative to the longitudinal axis such that the lateral space 86 is wider near the lower ends 22 of the pin bosses 20 and near their upper ends. The inner surfaces 84 are preferably set at about a 12.5° angle relative of the longitudinal axis so as to further provide the pin bosses 20 with a variable width or thickness as measured along the pin bore axis B in the direction of the longitudinal axis A, such that the pin bosses 20 are thinner near the lower ends 22 and continually thicken in the direction of the upper crown part 12 to a point at or above the apex of the pin bores 30. The inner surface 80 of the skirt portions 26 are preferably set at about a 2.5° angle relative to the outer surface 78.

In the first embodiment, the longitudinal forging of the lower crown part 14 from below also forms the underside surface 88 of the inner gallery floor 66.

In addition to forging the lower crown part 14 in the direction of the longitudinal axis A, the lower crown part 12 is further forged along an axis transverse to the longitudinal axis A. In the first embodiment, the lower crown part 12 is forged in the transverse direction of the bore axis B to form transverse forged recesses 90 in the strut portions 28 of the piston skirt 24. As illustrated in FIGS. 1-7, the pin bosses 20 are formed with an outer surface 92 that is spaced radially inwardly of the outer surface of the ring belt 38 and skirt wall 53. The forged recesses 90 extend laterally inwardly of the outer surface 92 of the pin bosses 20 above and below the pin bore axis B and are undercut in the longitudinal direction such that the recesses 90 could not be formed in their entirety from forging in the longitudinal direction A of the piston 10. As shown, the recesses 90 at least partly surround the pin bores 30 and extend laterally inwardly toward the pin bore axis B at a location above the pin bore axis B and thus are at least partially undercut in the longitudinal direction. The upper undercut regions of the recesses 90 are indicated at 94 and may extend completely across the face of the pin bosses at a location above the pin bores 30 and below the upper skirt wall 53.

The recesses 90 may also be longitudinally undercut adjacent the lower end of the piston such that a lower wall 94 of the recesses 90 is spaced above a lower end 96 of the struts 28. The recesses 90 may further extend into the skirt portions 26 and may likewise be longitudinally undercut to provide the skirt portions 28 with a generally I-shaped configuration. The transverse forging operation performed on the lower crown part 14 reduces the bulk of the material in the strut portions 28, which is displaced elsewhere to provide material for the formation of adjacent features of the lower crown part, including the pin bosses 20 and skirt portions 26. The walls of the recess 90 are preferably spaced from the pin bores 30, leaving a thickened hub region 98 surrounding the pin bores 30. The recesses 90 extend both below and above an upper apex 100 of the pin bores 30.

The multi-axial forging of the lower crown part 14, including the formation of the recesses 90, takes place prior to friction welding the lower part 14 to the upper part 12.

Figure 8:
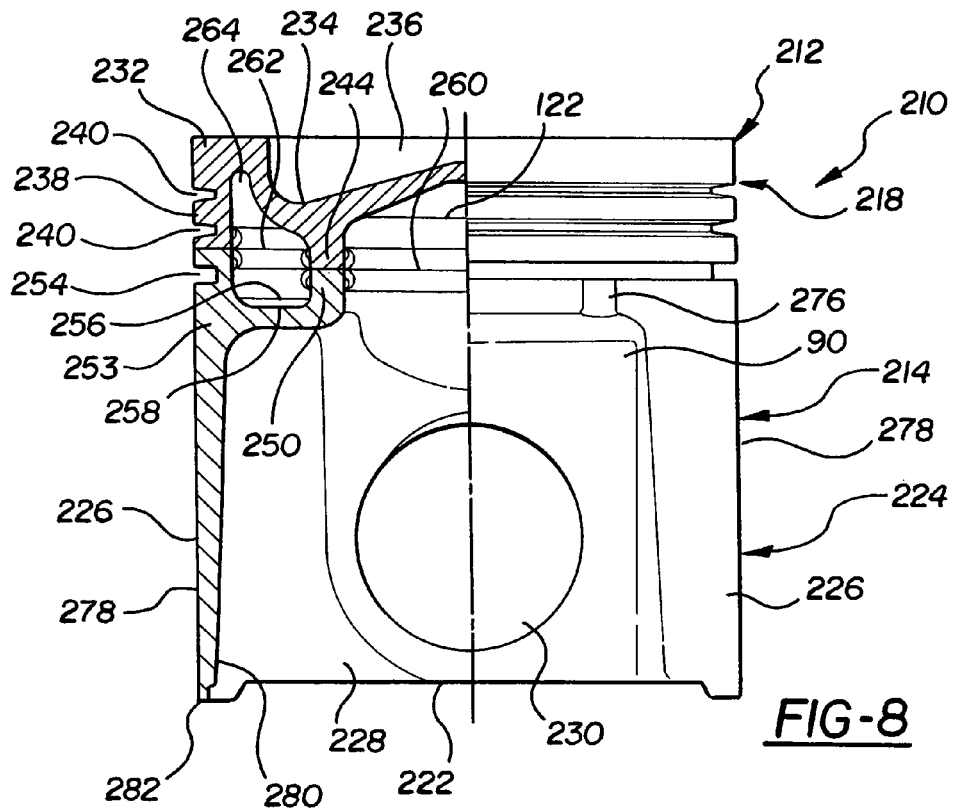
FIG. 8 is a cross-sectional view of an alternative embodiment of the invention.
Figure 9:
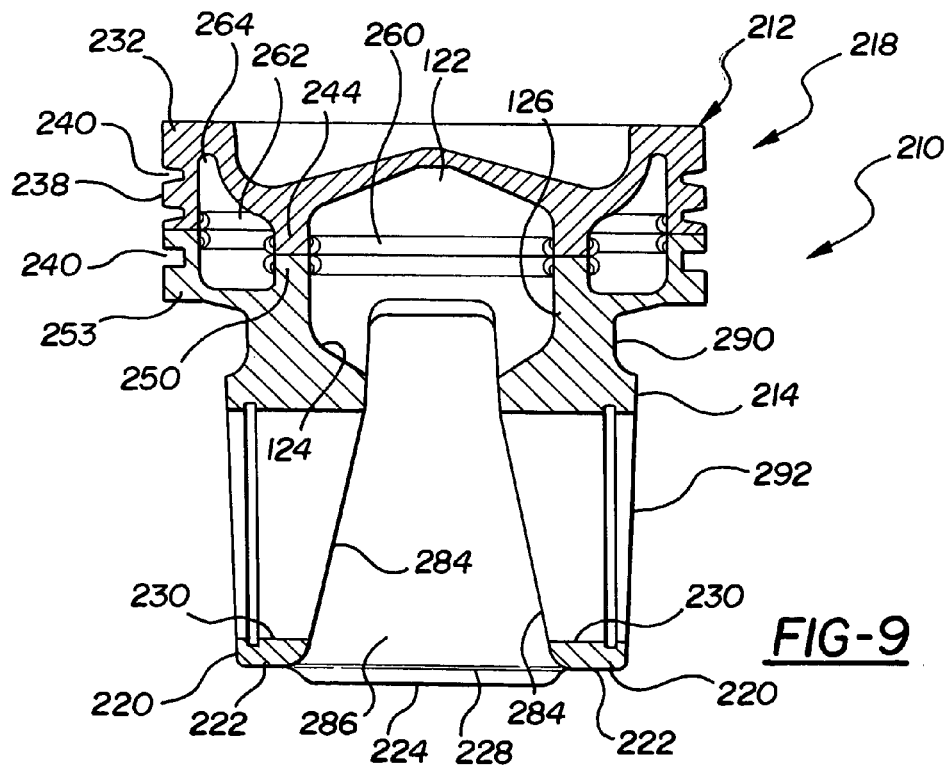
FIG. 9 is a cross-sectional view taken along lines 9-9 of FIG. 8.

Turning now to FIGS. 8 and 9, an alternative piston construction is shown generally at 210, wherein the same reference numerals are used to indicate corresponding features of the piston 10 of the first embodiment, but are offset by 200. The piston 210 includes upper and lower crown parts 212,214 having mating inner 244,250 and outer 238,253 walls which are united across mutual joining surfaces preferably by friction weld joints 260,262 to define a closed outer oil gallery 264. It will be seen that, unlike the piston 10 of the first embodiment, there is no inner gallery floor 66 or inner oil gallery 68 as in the first embodiment. Instead, a space 122 above the inner surfaces 284 of the pin bosses 220 extends from the pin bosses 220 upwardly to the combustion bowl wall 234 in open communication with the lateral space 286 between the inner surfaces 284 of the pin bosses 220.

As shown best in FIG. 9, the space 122 includes an undercut lower wall surface 124 that extends laterally outwardly from the inner surfaces 284 of the pin bosses 220 in relation to the pin bore axis B and transitions into an upwardly extending side wall 126 of the lower crown part 214 which is spaced laterally outwardly of the inner surfaces 280 of the pin bosses 220. The side wall 126 is preferably defined by the radially inner surface of the inner wall 250. The upper crown part 212 has an inner side wall 128 that defines an extension of the side wall 126 of the lower crown part 212, and is likewise defined by the inner surface of the inner wall 244 of the upper crown part 212. It will be appreciated from FIG. 9 that it would not be possible to forge the piston 210 as one piece (i.e., with the upper and lower crown parts 212,214 formed of one forged piece of the same material without the friction weld joint, since it would not be possible to form both the narrowing passage 286 between the pin bores 220 while at the same time forming the enlarged undercut space 122 above the pin bosses since the undercut regions of the space 122 could not be accessed by forging die tools extended from below through the pin bosses 220.

Figure 11:
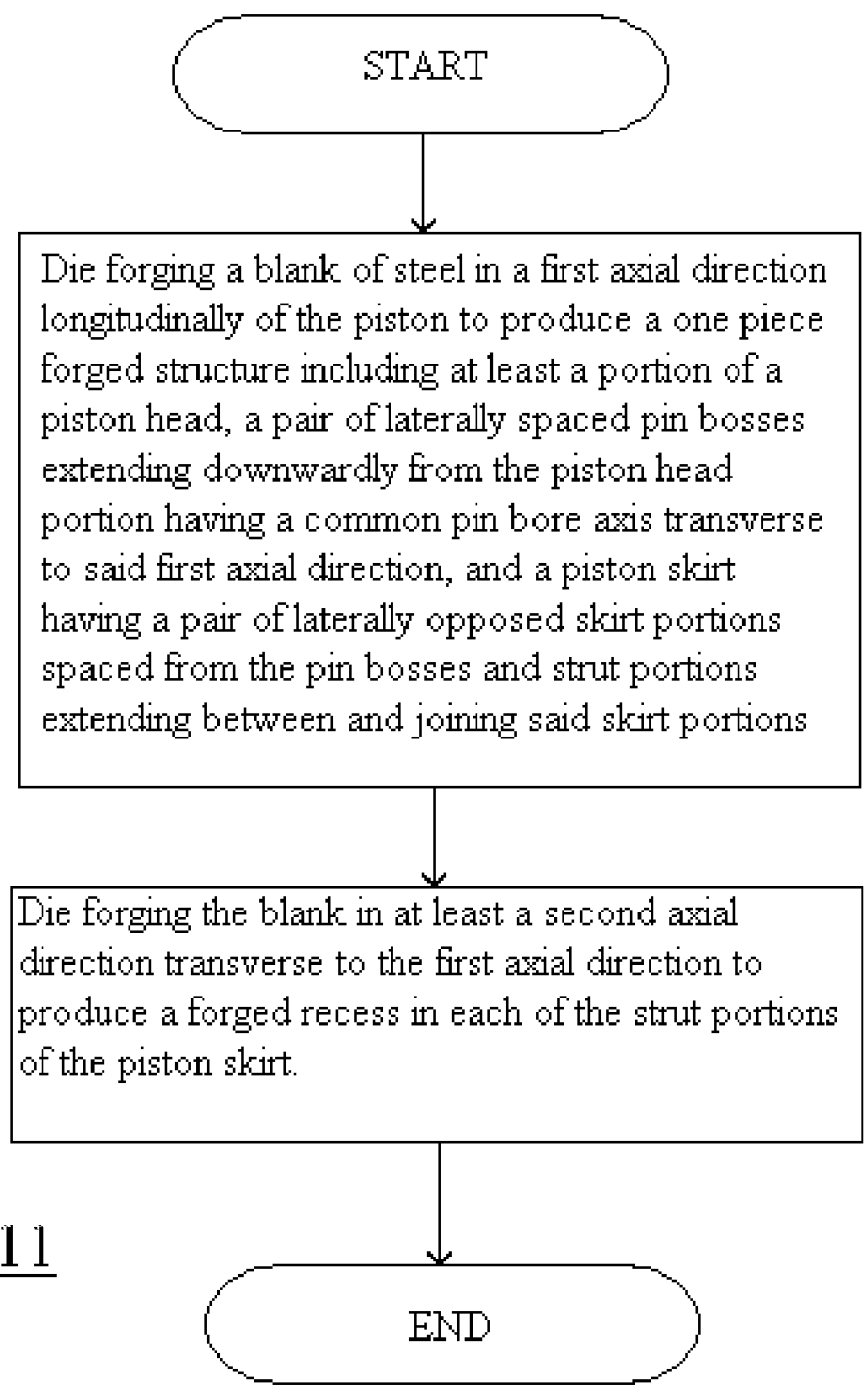
FIG. 11 is a flow diagram of the method according to the invention.

By forging the lower crown part 214 separately from the upper crow part 212 in the general manner illustrated in FIG. 11, it becomes possible to readily form such an undercut space 122 by selection of the appropriate upper die tools in the longitudinal forging direction. In other words, the upper die tool 110 of FIG. 11 is of a size and shape to form the side walls 126 and lower wall 124 in the lower crown part 214, such that when the upper and lower crown parts 212,214 are friction welded together, the enlarged undercut space 122 results, decreasing unneeded mass of material which is displaced elsewhere to form other structural parts of the lower crown part 214 to provide for a lighter, more efficient piston 210.

Like the piston 10 of the first embodiment, the piston 210 includes the same unitary piston skirt 224 which may be multi-axially forged to include the recesses as previously described. The description and illustration of such features and details are understood and will not be repeated in regard to the second embodiment 210. Thus, the principle difference between the first and second embodiments is that the second embodiment lacks the closed central oil gallery and is formed instead with an oversized, undercut space 122 extending above the pin bosses 220 in open communication with the space 86 between the pin bosses 220.

Figure 10:
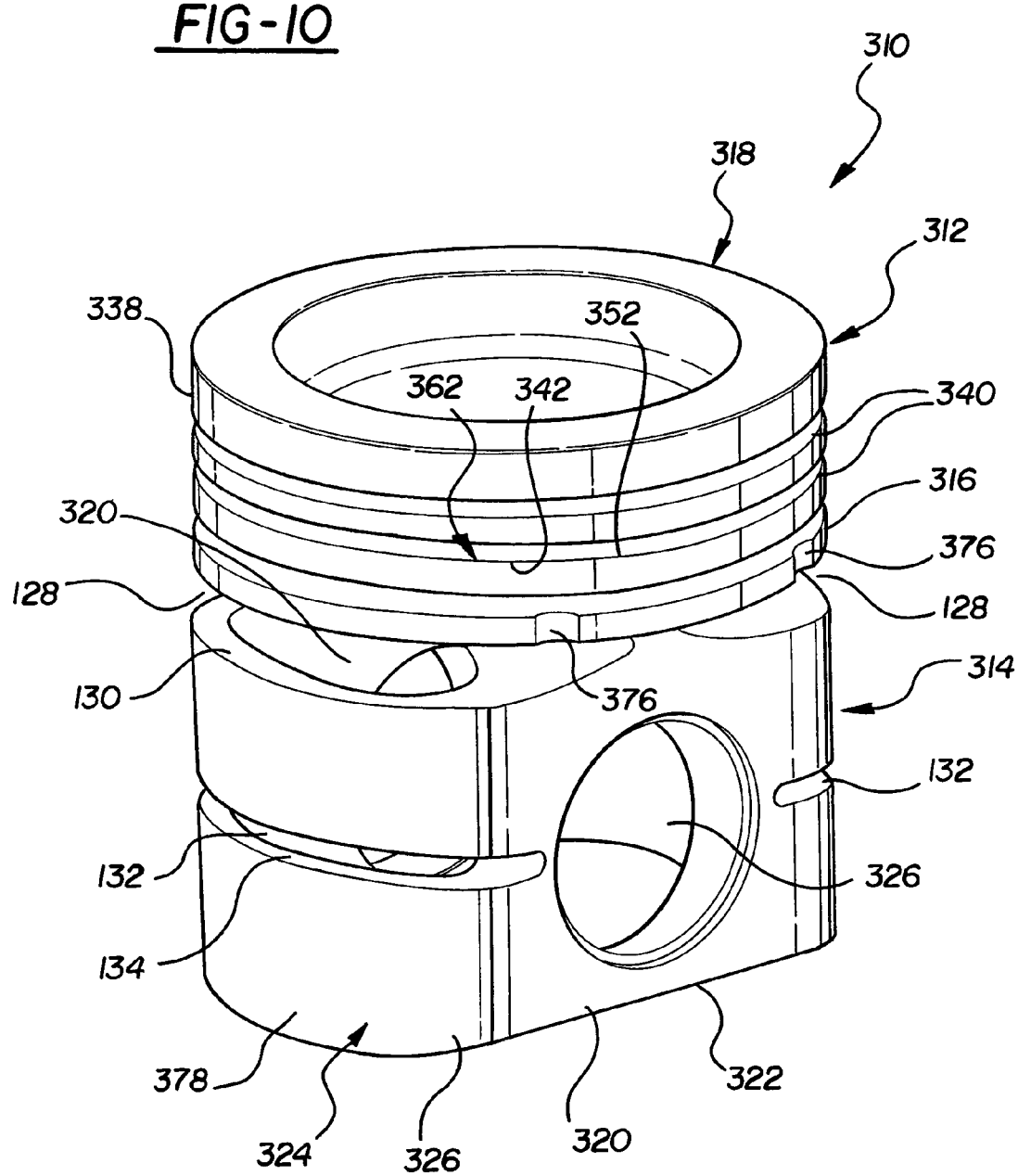
FIG. 10 is a perspective view of a piston constructed according to a third embodiment of the invention.

Turning now to FIG. 10, a third embodiment of the piston 310 is shown, with the same reference numerals being used to indicate like features in connection with the first embodiment 10, but offset by 300. The piston 310 includes an upper crown part 312 and a lower crown part 314 which are friction welded together in the manner previously described to permanently unite the crown parts into a unitary piston structure to define either a single or dual oil gallery structure as described above.

The lower crown part 314 is formed with pin bosses 330 and a piston skirt 324 which is forged as one piece with the pin bosses 320. Unlike the previous two embodiments, the skirt portions 326 are formed with at least a pair of opposed upper forged gaps or slots 128 defining upper free edges 130 of the skirt portion 326 which are uncoupled and spaced from the ring belt 338, but nonetheless united by the strut portions 328 to the pin bosses 320 as an integral structure of the lower crown part 314. The formation of the upper slots 128 takes place in a multi-axial forging operation in forging the lower crown part 314, wherein lateral die tools are brought laterally inwardly either along the pin bore axis or perpendicular to the pin bore axis in perpendicular relation to the longitudinal axis A of the piston 310 during the forging of the lower crown part 314. The upper slots 128 could be formed alone or in addition to the multi-axially formed recesses 90 described above with respect to the first embodiment 10 of the piston.

In addition to the upper slots 128, the skirt portions 326 may further be formed with one or more additional slots 132 intermediate the upper and lower ends of the skirt portions 310. One such slot 132 is illustrated in FIG. 9 as being in line with the pin bore axis B. The slots 128,132 serve to lighten the piston 10 by eliminating material and further assist in decreasing oil consumption of an engine by presenting free edges 130,134 which scrape oil from the walls of a piston cylinder during operation of the piston. The slots 128,132 further serve to vent the piston skirt portions 126 and to uncouple them from the head of the piston in order to isolate the skirt portions 126 from the direct flow of heat from the head and to introduce cooling spaces into the skirt portions 126.

The disclosed embodiments are representative of presently preferred forms of the invention, but are intended to be illustrative rather than definitive thereof. The invention is defined in the claims.

What is claimed is:

1. A method of forging a piston comprising:
    die forging a blank of steel in a first axial direction longitudinally of the piston to produce a one piece forged structure including at least a portion of a piston head, a pair of laterally spaced pin bosses extending downwardly from the piston head portion having a common pin bore axis transverse to said first axial direction, and a piston skirt having a pair of laterally opposed skirt portions spaced from the pin bosses and strut portions extending between and joining said skirt portions to the pin bosses as a one piece structure; and further die forging the blank in at least a second axial direction transverse to the first axial direction to produce a forged recess in each of the strut portions of the piston skirt and forming outer surfaces of the pin bosses and forging the strut portions in the second axial direction such that the recesses extend laterally inwardly of the outer surfaces of the pin bosses wherein a portion of the recesses are formed to extend into the skirt portions.

2. The method of claim 1 wherein the skirt portions are formed with a lower edge and the recesses are formed so as to be spaced from the lower edge of the skirt portions.

* * * * *